E. M. COLE.
TWIN PLANTER.
APPLICATION FILED JAN. 14, 1920. RENEWED JUNE 20, 1921.

1,388,171. Patented Aug. 23, 1921.

INVENTOR.
Eugene M. Cole
BY J. Hanson Boyden,
ATTORNEY

UNITED STATES PATENT OFFICE.

EUGENE M. COLE, OF CHARLOTTE, NORTH CAROLINA.

TWIN PLANTER.

1,388,171. Specification of Letters Patent. Patented Aug. 23, 1921.

Application filed January 14, 1920, Serial No. 351,279. Renewed June 20, 1921. Serial No. 479,085.

*To all whom it may concern:*

Be it known that I, EUGENE M. COLE, a citizen of the United States, residing at Charlotte, in the county of Mecklenburg and State of North Carolina, have invented certain new and useful Improvements in Twin Planters, of which the following is a specification.

This invention relates to seed planters, and more particularly to single row planters having double or twin hoppers for containing two kinds of seeds.

In practice, a farmer often desires to plant two kinds of seed in the same row, or again, different kinds of seed in adjacent or alternate rows, or he may wish to plant a number of rows of one kind of seed, and then a number of rows of another kind of seed, etc.

The main object of the invention, is, therefore, to provide a twin planter having means whereby the operator can set the machine to drop two kinds of seed simultaneously and continuously, or one kind of seed only, and can immediately change from one kind of seed to the other, at will, the construction being such that all of these adjustments can be made without stopping the planter.

My improved twin planters are provided with two hoppers and seed dropping mechanisms, arranged to deliver into the same furrow opener, and a further and important object of the invention is to devise means whereby, when it is desired to drop seed from one hopper only, the seed dropping mechanism of the other hopper is thrown out of operation entirely, thus eliminating unnecessary wear.

With the above objects in view, and to provide a simple, practical and efficient mechanism for carrying out such objects, my invention consists in the construction and arrangement of parts hereinafter described and claimed, and illustrated in the accompanying drawings, in which:—

Figure 1:
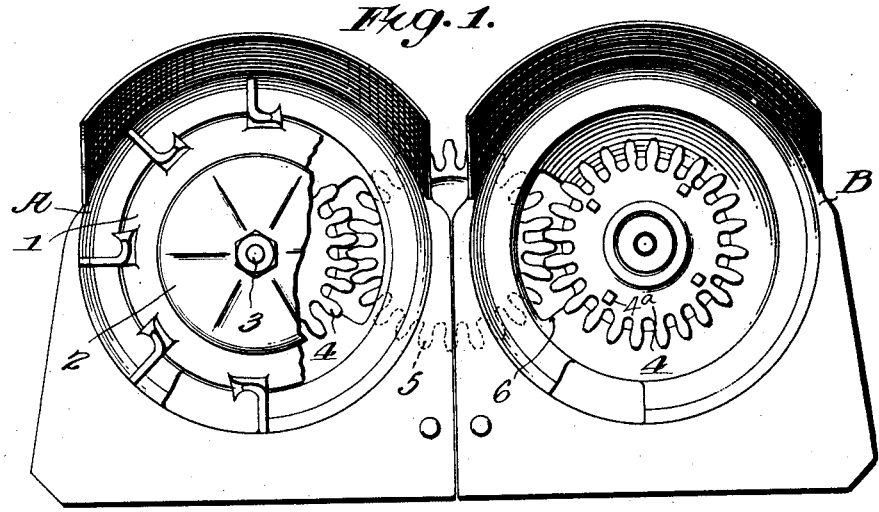
Figure 1 is a plan view of the two hoppers of my improved twin planter, the seed plate being partly broken away in one hopper and entirely omitted from the other.

Referring to the drawings in detail, the two hoppers are designated at A and B respectively, and it is understood that these hoppers have associated with them suitable seed boxes (not shown). In the bottom of each hopper is a rotary seed plate 1, which may be of any suitable construction, and is preferably held in position by means of a central plate or cap 2 secured by a bolt 3.

Rigid with each seed plate is an operating gear 4, the connection between the gears and seed plates being shown as consisting of lugs 4ª carried by the gears and engaging corresponding notches in the plates.

For rotating the seed plates, I provide a driving gear 5 located between the gears 4 and lying substantially in the same plane. The gear 5 is rotatably mounted on a bolt or pin 7 and rests on a plate 8, which in turn is supported on a bar 10 rigidly bolted to the bottom of the hoppers and extending between the same. The plate 8 is provided with lugs 9, spaced to receive the edges of the bar 10 between them, so as to hold the plate securely in position.

The plate 10 is provided with an elongated slot 11 through which the bolt 7 passes and in which it may freely slide. It will be seen that the bolt 7 and the slot 11 are substantially in line with the center bolts 3 of the seed plates.

Figure 2:
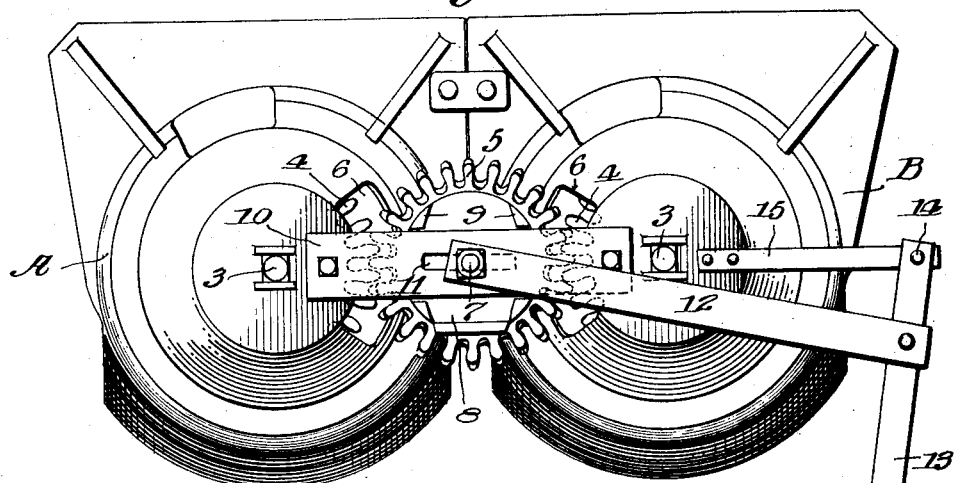
Fig. 2 is an inverted plan of the same.

From the above it will be apparent that the gear 5 is capable of lateral rectilinear movement relative to the two gears 4, and that it may be shifted into and out of mesh with such gears. It will be observed that all of these gears are in the nature of spur gears, and it will be further noted that they are provided with abnormally long teeth. Portions of the hoppers are cut away, as at 6 (Fig. 2) to provide openings through which the gears 4 and 5 may engage. When the gear 5 is in its intermediate or middle position shown in Fig. 2, it will be seen that it is in mesh with both of the gears 4. When shifted to the left, its teeth enter more deeply between the teeth of gear 4 of hopper A, the extent of shifting permitted being sufficient to cause the entire withdrawal of the teeth of gear 5 from mesh with gear 4 of the hopper B. When shifted to the right the teeth of gear 5 enter the teeth of gear 4 of hopper B to a sufficient extent to cause them to clear the teeth of gear 4 of hopper A. Thus, by shifting the gear 5 as described, in its own plane, it can be caused to mesh with and drive the gears 4 of both seed plates simultaneously, or it can be caused to mesh with and drive either one of the seed plate gears as desired.

When shifted to either of its extreme positions, one seed plate is driven and the other is idle, and when in its middle position, both seed plates are driven.

In order to shift the gear 5 and hold it in the desired selected position, I provide a link 12 pivoted at one end to the bolt 7 and at the other end to a lever 13. This lever is pivoted at one end, as at 14 to a fixed bracket or support 15, and the other end is received in a keeper 17 having three notches 16 as shown. By setting the lever in the intermediate or either end notch, the gear 5 is brought to its intermediate or either extreme position as desired.

Figure 3:
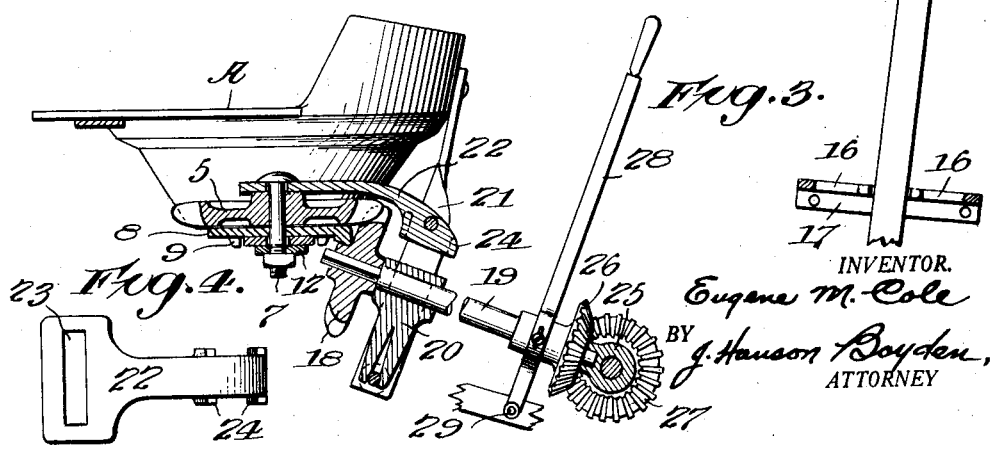
Fig. 3 is a central vertical section through the hoppers and driving mechanism parts being in elevation.
Figure 4:
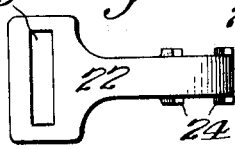
Fig. 4 is a detailed plan view of a supporting bracket, which I employ.

In order to impart motion to the driving wheels 5, a power wheel 18 is provided (see Fig. 3). This wheel, which has been omitted from Fig. 2 for the sake of clearness, is mounted on the squared end of an inclined shaft 19 extending at right angles to a line connecting the axes of the hoppers, and disposed centrally of and below the same. The gear 18 is located immediately between and adjacent the plate 8 at an angle to the gear 5, but in mesh with the same. It will be particularly noted, that owing to the relative position of the parts, and the peculiar shape of the teeth, the gear 5 remains in mesh with the power gear 18 in all of the positions, to which the gear 5 may be shifted.

The shaft 19 is journaled in a bracket 20 carried by a hanger 21 secured to the hoppers. Also attached to the hanger 21 is a brace 22 overlying the gear 5 and provided with an elongated slot 23, through which the bolt 7 works. The brace 22 is provided with lugs 24 for engaging the hanger 21, whereby the parts are securely held.

The lower end of shaft 19 is journaled in a casing 25, and has slidably mounted thereon a beveled gear 26. This gear 26 meshes with a second gear 27 which is suitably driven from the ground wheel of the planter. In order to disconnect the seed dropping mechanism entirely from the ground wheel, the gear 26 is shifted out of mesh with the gear 27 by means of a lever 28 pivoted at 29 to a fixed support.

In practice the two hoppers will be so mounted on the planter frame, that a line passing through their axes will lie at right angles to the furrow. In other words the hoppers extend transversely of the furrow, the shaft 19 extending longitudinally of the furrow. By virtue of this arrangement, both hoppers are at all times in full view of the operator, who is thus able to watch the working thereof.

What I claim is:—

1. In apparatus of the class described, the combination with a pair of operating gears, of a driving gear mounted between the operating gears, and means for shifting said driving gear laterally, in its own plane, into mesh with either one of the operating gears, or simultaneously with both of said gears, as desired.

2. In apparatus of the class described, the combination with a pair of operating gears, of a driving spur gear mounted between the said operating gears, said spur gear having abnormally long teeth, and means for shifting said driving spur gear laterally in its own plane, said driving spur gear when in either of its two extreme positions meshing with one of the operating gears only, and when in an intermediate position, meshing with both said operating gears.

3. In apparatus of the class described, the combination with a pair of operating gears, of a driving gear, means for shifting said driving gear laterally in its own plane into positions where it meshes selectively with either one or both of said operating gears, and a power gear meshing with said driving gear in all of its positions.

4. In apparatus of the class described, the combination with a pair of operating gears, of a driving gear mounted between the operating gears, all of said gears lying in substantially the same plane, and means for shifting said driving gear laterally into a position where it meshes with both operating gears simultaneously, or into positions where it meshes with either one of said gears, only.

5. In apparatus of the class described, the combination with a pair of operating gears, of a driving gear mounted between the operating gears, all of said gears lying in substantially the same plane, means for shifting said driving gear laterally by a rectilinear movement into positions where it meshes selectively with either one or both of said operating gears, and a power gear meshing with said driving gear in all of its positions.

6. In apparatus of the class described, the combination with a pair of operating gears, of a driving gear mounted between the operating gears, all of said gears lying in substantially the same plane, and means for shifting said driving gear laterally by a rectilinear movement to cause it to mesh with either one or both of operating plate gears as desired.

7. In apparatus of the class described, the combination with a pair of operating gears of a driving gear mounted between the operating gears, all of said gears lying in substantially the same plane, and means for shifting said driving gear laterally in a line passing through the axes of all three gears to cause said driving gear to mesh with either one or both of said operating gears, as desired.

In testimony whereof I affix my signature.

EUGENE M. COLE.